United States Patent

[11] 3,627,824

[72] Inventors: Yasuo Fujimoto;
Shinsuke Koshimoto, both of Machida-shi, Japan
[21] Appl. No. 834,524
[22] Filed June 18, 1969
[45] Patented Dec. 14, 1971
[73] Assignee Kyowa Hakko Kogyo Co., Ltd.
[32] Priority June 25, 1968
[33] Japan
[31] 43/43628

[54] PROCESS FOR CRYSTALLIZING γ-ALKYLMERCAPTOLYSINE DIHYDROCHLORIDE
14 Claims, No Drawings
[52] U.S. Cl. .................................................... 260/534 S
[51] Int. Cl. .................................................... C07c 149/24
[50] Field of Search ......................................... 260/534 S, 534 L

[56] References Cited
UNITED STATES PATENTS
2,498,300  2/1950  Scott et al. .................... 260/534 L OTHER REFERENCES
Weissberger, Technique of Organic Chemistry, Vol. III, pp. 474–479

Primary Examiner—James A. Patten
Assistant Examiner—Jacqueline L. Davison
Attorney—Craig, Antonelli and Hill ABSTRACT: A process for obtaining substantially pure crystals of γ-alkylmercaptolysine dihydrochloride which comprises mixing an aliphatic or alicyclic alcohol, an organic ether or a mixture thereof with a methanolic or an aqueous methanolic solution of a γ-alkylmercaptolysine dihydrochloride and preferably maintaining the mixture at a low temperature, thereby forming crystals of said compound. The product is useful as an antioxidant and as an accelerator for the cure of cuts, burns and the like.

PROCESS FOR CRYSTALLIZING γ-ALKYLMERCAPTOLYSINE DIHYDROCHLORIDE

This invention relates to a process for crystallizing γ-alkylmercaptolysine dihydrochloride. More particularly, it relates to the crystallization of γ-alkylmercaptolysine dihydrochloride by mixing an alcohol or an ether with a methanolic solution of γ-alkylmercaptolysine dihydrochloride.

γ-alkylmercaptolysine ( γ-alkylthiolysine) dihydrochloride is a novel amino acid which is effective and useful as an antioxidant or as an accelerator for the curing of cuts, wounds, burns, etc. This compound has the following general formula:

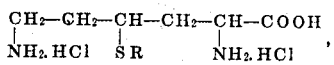

wherein R is an alkyl group (preferably of one to six carbon atoms).

The γ-alkylmercaptolysine dihydrochlorides of the above general formula are prepared by reacting γ-chlorolysine or salts thereof with an alkylmercaptan or salt thereof in water or in an aqueous solution of alcohols, ketones, ethers, etc., amides of organic acids and the like to produce γ-alkylmercaptolysine, and then acidifying with hydrochloric acid. Salts which may be employed in the reaction include, for example, the sodium salt, potassium salt, calcium salt, etc. of the particular reactants used. The method of preparing γ-alkylmercaptolysine dihydrochlorides is described in detail in copending application Ser. No. 834,508, filed on June 18, 1969. The reaction generally proceeds in accordance with the following reaction scheme:

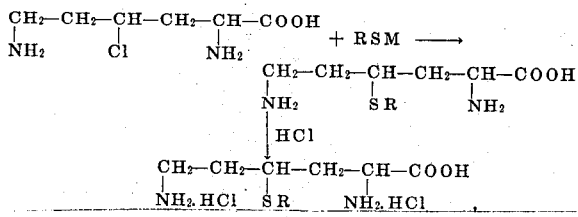

wherein R is an alkyl group as defined above and wherein M is hydrogen, an alkali metal or an alkaline earth metal.

One of the objects of the present invention is to provide a method for crystallizing γ-alkylmercaptolysine dihydrochloride.

Another object of the present invention is to provide a process for obtaining crystals of γ-alkylmercaptolysine dihydrochloride which may be carried out in an efficacious and relatively simple manner.

A further object of the invention is to provide crystals of γ-alkylmercaptolysine dihydrochloride which are substantially pure and devoid of undesirable byproducts.

These and other objects and advantages of the present invention will become apparent to those skilled in the art from a consideration of the following specification and claims.

The thus-prepared γ-alkylmercaptolysine or salt thereof is isolated by means of the following procedure from the reaction mixture in which the salt or hydrogen chloride produced by the replacement of the chlorine of the reactant as well as unreacted reactants are present. First, the reaction solution is treated with a weakly acidic ion exchange resin (H⁺ type), for example, Amberlite IRC-50 (trade name), in order to dissociate the salts of the alkylmercaptan. Then, the solution is adsorbed on an acidic or basic ion exchange resin, and elution is carried out with an acid or a base. The eluate is concentrated to a syrup, and methanol (optionally containing hydrogen chloride) is added thereto in order to obtain a clear solution. If a methanolic hydrogen chloride solution is not used, hydrogen chloride gas is introduced into the solution to make it acidic. The excess of hydrogen chloride is removed by distillation in vacuo. In accordance with the present invention, the resultant dihydrochloride product is crystallized by adding the methanol or aqueous methanol solution obtained above to an aliphatic (excluding methanol) or an alicyclic alcohol, or a mixture of two or more, or to an ether having two or more carbon atoms or to a mixture of these solvents. Alternatively, the solvent can be added to the methanolic solution of γ-alkylmercaptolysine dihydrochloride.

The process of the present invention will now be explained in more detail. Specifically, an example of a procedure for obtaining the methanolic solution or the aqueous methanolic solution of γ-alkylmercaptolysine dihydrochloride, employed in the process of the present invention, is carried out as follows: The solution obtained by the reaction of γ-chlorolysine or a salt thereof with an alkylmercaptan or a salt thereof is treated with a weakly acidic ion exchange resin (H⁺ type), for example, Amberlite IRC-50 Duolite CS-100 or 101, or the like. After evaporating an excess amount of mercaptan under reduced pressure by distillation, the solution is treated with a strongly acidic ion exchange resin (H⁺ type), for example, Amberlite IR 120 (trade name) or the like, or a strongly basic ion exchange resin (OH⁻ type), for example, Amberlite IRA-410, IRA-400, Dowex-1 or -2 or the like, in order to effect adsorption. The resin is thoroughly washed with water until the effluent is about neutral and is then eluted with hydrochloric acid, to obtain an aqueous solution of γ-alkylmercaptolysine dihydrochloride. The elution of the product may be effected with an alkaline aqueous solution, for example, ammonia water, an aqueous sodium hydroxide solution, an aqueous potassium hydroxide solution and the like, instead of hydrochloric acid. In this case, hydrochloric acid is added after the elution to give the dihydrochloride product. Alternatively, hydrochloric acid is added to the above-mentioned reaction solution until the pH thereof is adjusted to a weakly acidic condition, the solution is concentrated to dryness, the residue thus obtained is extracted with concentrated hydrochloric acid and the extracted solution is concentrated. The resultant aqueous solution containing γ-alkylmercaptolysine dihydrochloride is concentrated, dried under reduced pressure or dried by lyophilizing and, subsequently, a small amount of methanol or aqueous methanol is added thereto until the product is dissolved. In this case, the yield of crystals is higher as the moisture content is lower. At the time of or after the dissolution, an excess amount of hydrogen chloride may be present. A solution containing at least one aliphatic or alicyclic alcohol or at least one ether having two or more carbon atoms is added to the thus obtained solution or vice versa. In the case of using an alcohol-ether mixture, the most preferable range of ratio by volume of alcohol-ether mixture is 10:5 to 10:1. The solution is left to stand as it is and, consequently, crystals of γ-alkylmercaptolysine dihydrochloride are separated. The yield of crystals is higher when they are preserved in a refrigerated room.

Alcohols employed in the present crystallization process preferably include those having two to eight carbon atoms, for example, ethanol, n-propanol and isomers thereof, n-butanol and isomers thereof, n-pentanol and isomers thereof, n-hexanol and isomers thereof, n-heptanol and isomers thereof, n-octanol and isomers thereof, cyclobutanol, cyclopentanol, cyclohexanol, cyclooctanol, ethylene glycol, propylene glycol and the like. However, alcohols having more than eight carbon atoms also may be employed.

Ethers to be utilized include those having two or more carbon atoms, for example, chloromethyl ether, methyl ethyl ether, chloromethyl ethyl ether, ethyl ether, chloroethyl ether and isomers thereof, dichloromethyl crystallization dichloroethyl ether and isomers thereof, epichlorohydrin, n-propyl ether and isomers thereof, allyl ether, allyl ethyl ether, n-butyl ether and isomers thereof, n-amyl ether and isomers thereof, dichloropropyl ether, dichlorobutyl ether, methyl n-propyl ether and isomers thereof, ethyl n-propyl ether and isomers thereof, methyl n-butyl ether and isomers thereof, ethyl n-butyl ether and isomers thereof, n-hexyl ether, n-heptyl ether, n-octyl ether; dialkylene glycols, for example, diethylene glycol, dipropylene glycol; mono- or dialkyl ethers of glycols, for example, mono- or dimethyl ether, mono- or diethyl ether, mono- or di-n-propyl ether, the mono- or di-n-butyl ether of ethylene glycol, propylene glycol, diethylene glycol or dipropylene glycol; or monoalkyl ether monoacetates of glycols, for example, monomethyl ether monoacetate, monoethyl ether monoacetate, mono-n-propyl ether monoacetate, the mono-n-butyl ether monoacetate of ethylene glycol, propylene glycol, diethylene glycol or dipropylene glycol; benzyl ether, anisole, ethyl benzyl ether, n-propyl benzyl ether and isomers thereof, n-butyl benzyl ether and isomers thereof, 1,3- or 1,4-dioxane, trioxane, 2,4,6-trimethyltrioxane, tetrahydrofuran and the like.

Thus, it can be said generally that aliphatic or alicyclic alcohols having at least two carbon atoms and/or organic ethers having at least two carbon atoms are employed in the crystallization procedure of the present invention. The alcohols or ethers may be unsubstituted or substituted with, for example, alkyl or halo groups.

The γ-alkylmercaptolysine produced in the reaction may be either an optically active or optically inactive form. Either form is suitable in the crystallization process of the present invention. The following examples are given merely as illustrative of the present invention and are not to be considered as limiting.

EXAMPLE 1

Fifty grams of γ-chloro-L-lysine is dissolved in a mixture of 200 ml. of water and 100 ml. of ethanol, and 25 g. of the sodium salt of methylmercaptan is added thereto. The mixed solution is refluxed with heating for 6 hours. After the completion of the reaction, the ethanol is removed by distillation and the reaction solution is stirred in a beaker with 100 ml. of the ion exchange resin, Amberlite IRC-50 (trade name) ($H^+$ type), for 1 hour. The resin is filtered and washed with water. Methylmercaptan dissolved in the filtrate is removed by distillation in vacuo. The total volume of the resulting filtrate is made up to about 1,000 ml. by dilution or concentration, and the filtrate is passed through a column filled with 1 liter of the ion exchange resin, Amberlite IRA-410 (trade name) ($OH^-$ type), at a space velocity of 2 (a flow rate of 2 l./hour). Thereafter, the column is washed with water until the washings are no longer alkaline and is then eluted with 1N to 3N HCl. The starting point and the end point of the elution of γ-methylmercapto-L-lysine are determined by a ninhydrin reaction. The fraction between the two points is concentrated to a syrup and water is again added thereto, and the concentration step is repeated in order to remove free hydrogen chloride by distillation. Thereafter, the concentrated syrup solution is dissolved in 50 ml. of methanol, and this solution is poured into a mixed solution of 1 liter of ethanol and ethyl ether (the ratio by volume, 8:2). Consequently, γ-methylmercapto-L-lysine dihydrochloride is immediately crystallized. 43 g. of γ-methylmercapto-L-lysine · dihydrochloride is obtained by drying the separated substances.

Elementary analysis shows the following results:
Calc.: C 31.24, H 6.76, N 10.51, S 12.22
Found: C 31.70, H 6.79, N 10.58, S 12.08.

EXAMPLE 2

Fifty grams of γ-chloro-D, L-lysine is dissolved in 400 ml. of water, and 25 g. of the sodium salt of methylmercaptan is added thereto. The solution is refluxed with heating for 7 hours. After the completion of the reaction, the pH of the reaction solution is adjusted to about 4 with concentrated hydrochloric acid and is then concentrated to dryness. The residue is extracted with 300 ml. of concentrated hydrochloric acid. Sodium chloride thus produced as a byproduct is only slightly dissolved and remains as a precipitate in the conc. hydrochloric acid. Only γ-methylmercapto-DL-lysine is extracted as the dihydrochloride. Concentration in vacuo is carried out in order to remove hydrogen chloride. Subsequently, the total volume is diluted with water to make up 500 ml. and is passed through a column filled with 800 ml. of the ion exchange resin, Amberlite IRA-410 (trade name) ($OH^-$ type). Thereafter, γ-methylmercapto-DL-lysine is eluted in the same manner as described in example 1. The eluted fraction is concentrated, and water is again added thereto. The concentration procedure is then repeated. After free hydrogen chloride is removed by the above distillation, the total volume is made up to 50 ml. with methanol. The solution is added to 1 liter of a mixed solution of i-propanol and ethylene glycol dimethyl ether (2:1), and left to stand in a cold room. As a result, 39 g. of crystals of γ-methylmercapto-DL-lysine dihydrochloride is obtained.

EXAMPLE 3

Fifty grams of γ-chloro-L-lysine is dissolved in a mixed solvent of 200 ml. of water and 200 ml. of methanol, and 32 g. of the sodium salt of ethylmercaptan is added thereto. The mixture is refluxed with heating for 8 hours. After the completion of the reaction, the same procedure as described in example 1 is conducted, with the result that 45 g. of γ-ethylmercapto-L-lysine dihydrochloride is obtained.

Elementary analysis shows the following results:
Calc: C 34.53, H 7.19, N 10.07, S 11.51
Found: C 34.29, H 7.10, N 10.12, S 11.60

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for crystallizing γ-alkylmercaptolysine dihydrochloride which comprises mixing (1) at least one aliphatic or alicyclic alcohol having at least two carbon atoms or (2) a mixture of said alcohol and at least one organic ether having at least two carbon atoms with a methanolic or aqueous methanolic solution of γ-alkylmercaptolysine dihydrochloride having the general formula:

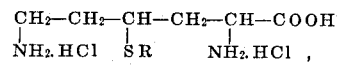

wherein R is an alkyl group, thereby forming crystals of γ-alkylmercaptolysine dihydrochloride.

2. The process of claim 1, wherein the crystallizing solution of γ-alkylmercaptolysine dihydrochloride is maintained at a temperature of and below about 40° C.

3. The process of claim 1, wherein the alcohol has from two to eight carbon atoms.

4. The process of claim 1, wherein the alcohol is an alkanol having from two to eight carbon atoms.

5. The process of claim 1, wherein the ether has from two to eight carbon atoms.

6. The process of claim 1, wherein the compound being crystallized is γ-methylmercaptolysine dihydrochloride.

7. The process of claim 1, wherein the compound being crystallized is γ-ethylmercaptolysine dihydrochloride.

8. A process for obtaining crystals of γ-alkylmercaptolysine dihydrochloride having the general formula:

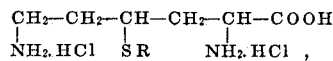

wherein R is an alkyl group of one to six carbon atoms, which comprises reacting γ-chlorolysine or a salt thereof with an alkylmercaptan having from one to six carbon atoms or a salt thereof, acidifying the resultant γ-alkylmercaptolysine with hydrochloric acid, adding methanol or an aqueous methanol solution to the obtained γ-alkylmercaptolysine dihydrochloride, adding (1) at least one aliphatic or alicyclic alcohol having at least two carbon atoms or (2) a mixture of said alcohol and at least one organic ether having at last two carbon atoms to the methanolic or aqueous methanolic solution of γ-alkylmercaptolysine dihydrochloride, thereby forming crystals of γ-alkylmercaptolysine dihydrochloride, and separating said dihydrochloride product from the resultant solution.

9. The process of claim 8, wherein the crystallizing solution of γ-alkylmercaptolysine dihydrochloride is maintained at a temperature of and below about 40° C.

10. The process of claim 9, wherein the alcohol has from two to eight carbon atoms.

11. The process of claim 9, wherein the ether has from two to eight carbon atoms.

12. The process of claim 8, wherein said methanolic or aqueous methanolic solution of γ-alkylmercaptolysine dihydrochloride is added to the alcohol or ether compound.

13. The process of claim 1, wherein an alcohol-organic ether mixture having a ratio of 10:5 to 10:1 by volume is mixed with said methanolic solution.

14. The process of claim 8, wherein an alcohol-organic ether mixture having a ratio of 10:5 to 10:1 by volume is added to said methanolic solution.